C. C. DU BOSE.
SAW JOINTER AND GAGE.
APPLICATION FILED MAY 23, 1908.
941,981.
Patented Nov. 30, 1909.
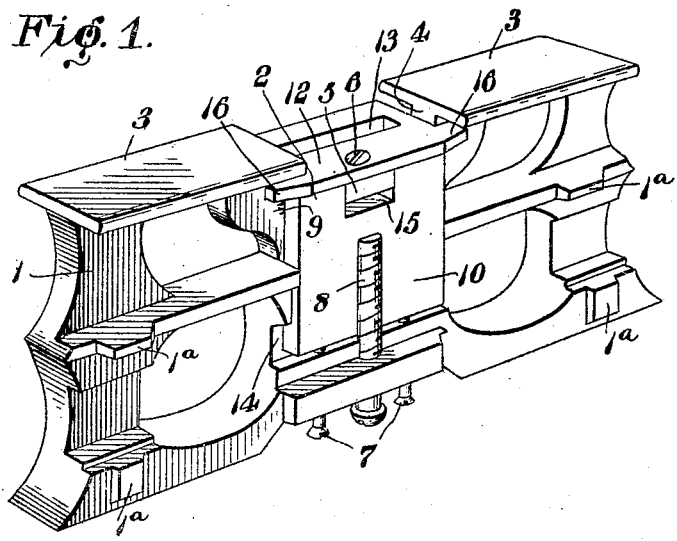
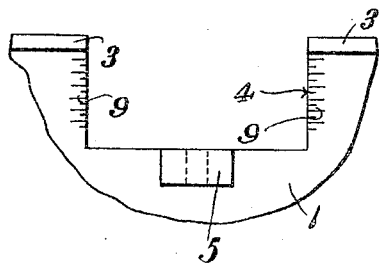
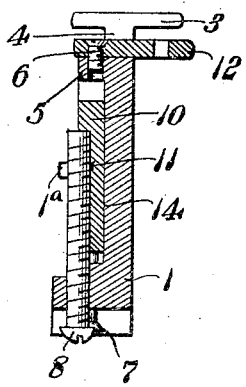
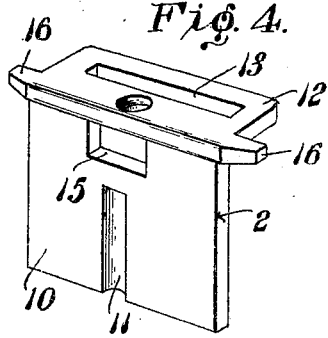
Inventor
C. C. DuBose,

UNITED STATES PATENT OFFICE.

CLAYBORN C. DU BOSE, OF MERRYVILLE, LOUISIANA.

SAW JOINTER AND GAGE.

941,981. Specification of Letters Patent. Patented Nov. 30, 1909.

Application filed May 23, 1908. Serial No. 434,527.

*To all whom it may concern:*

Be it known that I, CLAYBORN C. DU BOSE, a citizen of the United States, residing at Merryville, in the parish of Calcasieu and State of Louisiana, have invented certain new and useful Improvements in Saw Jointers and Gages, of which the following is a specification.

The present invention has for its object to devise a combined saw jointer and gage, which is simple, inexpensive and efficient.

A further object of the invention is to provide a device of this character, adapted to form an efficient gage for swaging the raker teeth of a saw, and provided with means for enabling the teeth of the saw to be accurately dressed.

The invention further consists of the novel features and details of construction which hereinafter will be set forth, illustrated, and claimed.

Referring to the drawings forming a part of the specification: Figure 1 is a perspective view of the device embodying my invention. Fig. 2 is a vertical section through the central portion thereof. Fig. 3 is a detail view of the gage frame, or body. Fig. 4 is a perspective view of the gage-plate.

Corresponding and like parts are referred to in the following description and indicated in all the views of the drawings by the same reference characters.

The device comprises a body or frame 1, a gage-plate 2, and set screws for adjusting said gage-plate with relation to the body or frame.

The frame 1 may be of any convenient size and is provided at its top with a flange 3 which preferably projects beyond opposite sides of the frame and which is interrupted or cut away midway of its ends, as at 4, to receive the head of the gage-plate. The frame is preferably constructed of light cast metal, and is provided in its body portion with openings to reduce the weight of the device and to lessen the cost of construction. A lug 5 projects laterally from the frame at a point opposite the cut away portion of the flange, and said lug is formed with a threaded opening to receive a set screw 6 which coöperates with set screws 7 to adjust and fix the position of the gage-plate 2.

Graduations 9 are provided upon one side of the frame near the ends of the cut away portion to assist in adjusting the gage-plate 2 when moving the same according to the length of the teeth to be determined.

Set screws 7 are threaded into openings formed in the edge of the frame opposite to that having the flange 3, and are adapted to engage the lower edge of the vertical member of the gage-plate to act jointly with the set screw 6 to properly position said gage-plate.

A set screw 8 is threaded into the lower edge portion of the frame at a point between the set screws 7 and is intended, in the operation of the device, to retain a file in place when the device is to be used for dressing or jointing saws in the ordinary manner. This set screw also acts to retain the gage-plate in proper position by engaging with the lower portion thereof. In order that the set screws may not interfere with the gage-plate the vertical plate 10 has a groove 11 in the outer side of its vertical member to receive the upper portion of the set screw. The file for dressing and jointing saws is adapted to be retained in place by lugs $1^a$ formed upon one side of the frame, said lugs forming a seat in which said file is fitted and retained in place as herein stated, by the set screw 8.

The gage-plate consists essentially of two members 10 and 12, which have a right angular arrangement, the upper member 12 extending across the frame and adapted to operate in the cut away portion 4, and formed with a longitudinal slot 13 to receive the raker teeth of the saw to be gaged. The vertical member 9 is adapted to slide in a guide or seat 14 formed in a side of the frame and is provided with an opening 15 to receive the lug 5. Projections 16 extend from opposite corners of the gage-plate and overlap portions of the frame adjacent the cut away portion 4 of the flange and are adapted to coöperate with the graduations 9 to fix the position of the gage-plate to suit the particular saw to be filed.

In the operation of the device the saw is placed against one side of the frame with the flange extending over the teeth, the gage-plate being properly adjusted so that the raker teeth project through the slot of the head the required distance, thereby determining their length as will be readily understood. For side filing, dressing or jointing, a file is secured in the side seat of the frame by means of the set screw 8, as herein described, the operation being accomplished in the usual manner. For adjusting the gage-plate the set screw 6 may be loosened and the set screws 7 advanced, or the set screws 7 may be loosened and the set screw 6 advanced, the exact position of the gage-plate being determined by the graduations 9.

From the foregoing description it will be understood that I have provided a combined saw gage and jointer which may be cheaply manufactured, easily adjusted for different saws, and conveniently handled for gaging the raker teeth and for jointing or dressing the teeth.

Having thus described the invention, what is claimed as new is:

A gage as specified comprising a frame having a recess formed in one side thereof, a flange formed along the upper edge of said frame having an intermediate interrupted portion, a gage plate mounted in the recess in said frame, set-screws disposed through the lower edge of said frame and engaged against the lower edge of said gage plate to adjustably support the same, a head formed on said gage plate and extended laterally therefrom through the interrupted portion, said gage plate having a recess formed through the upper end thereof beneath said head, a lug projected outwardly from said frame in alinement with the interrupted portion and extended into the recess in said gage plate, and a set-screw carried by said head and extended into the recess in said gage plate to engage through said lug to retain said gage plate in adjusted position.

In testimony whereof I affix my signature in presence of two witnesses.

CLAYBORN C. DU BOSE. [L. S.]

Witnesses:
W. W. JOHNSON,
L. G. BROWN.